Dec. 24, 1968    R. H. RICHENS ET AL    3,417,967
FLUID MIXING DEVICES

Filed July 17, 1967    6 Sheets-Sheet 1

Inventors
Raymond Harold Richens
William James White
William Frank Cole Richardson
By Cushman, Darby & Cushman
Attorneys

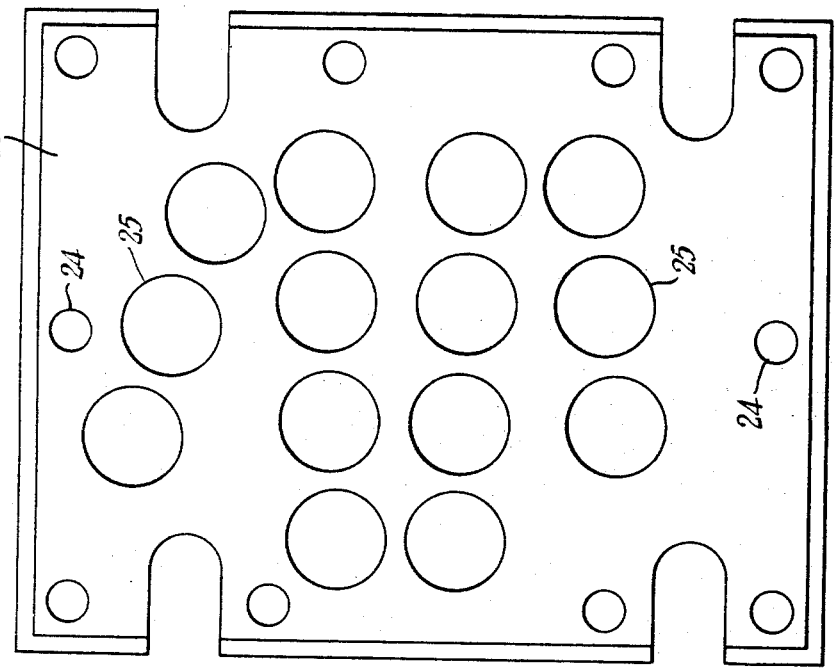
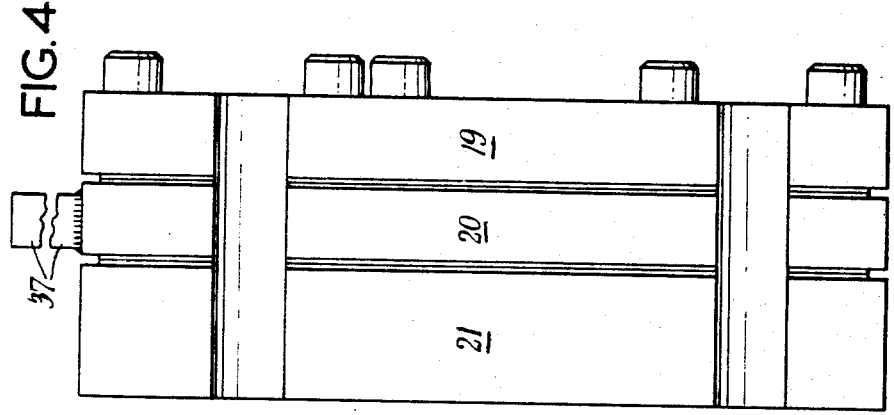

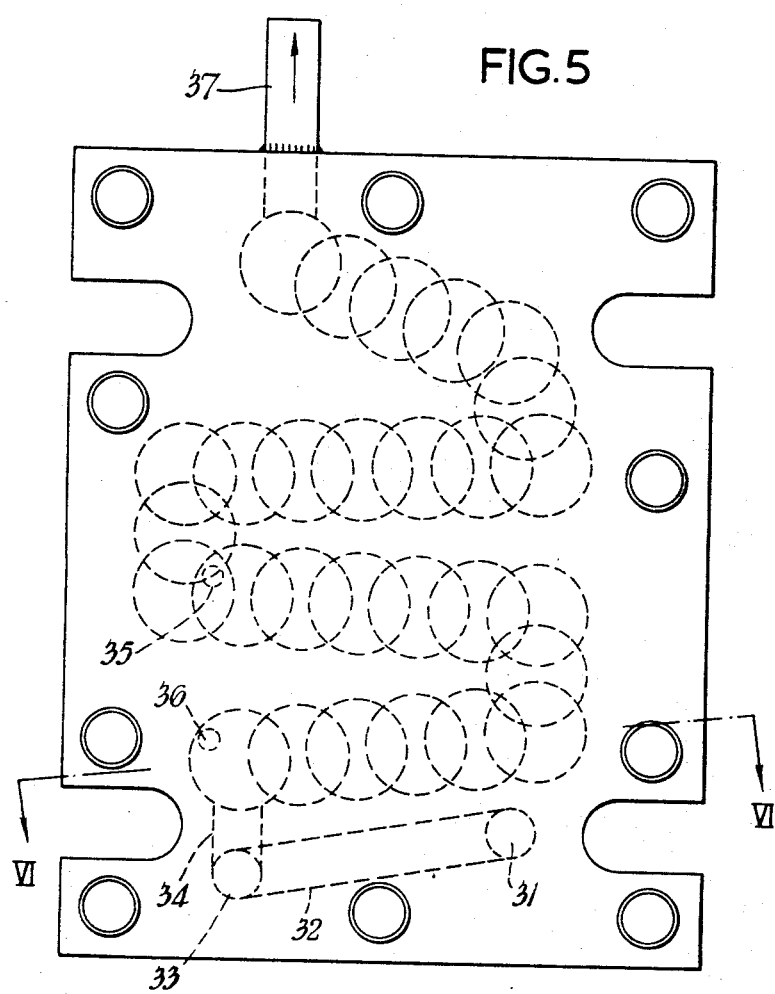
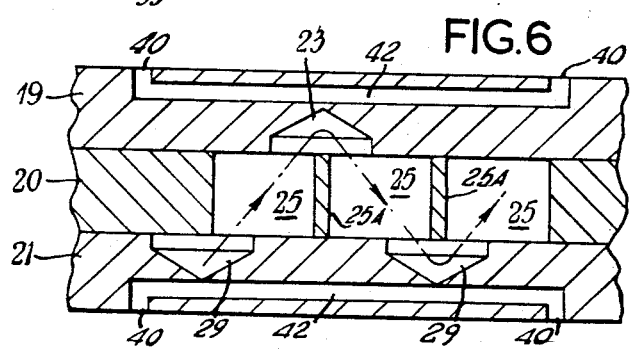

Dec. 24, 1968     R. H. RICHENS ET AL     3,417,967
FLUID MIXING DEVICES
Filed July 17, 1967     6 Sheets-Sheet 4
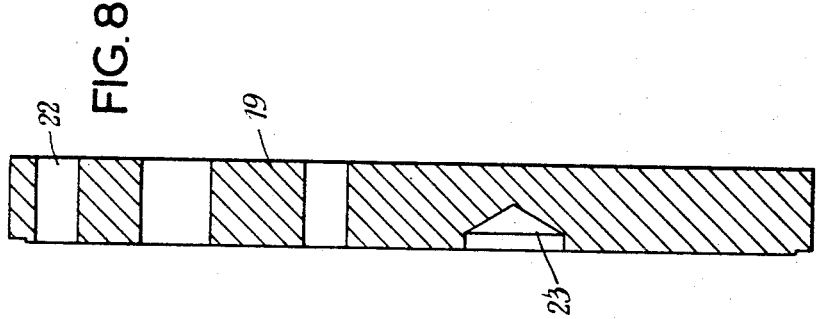
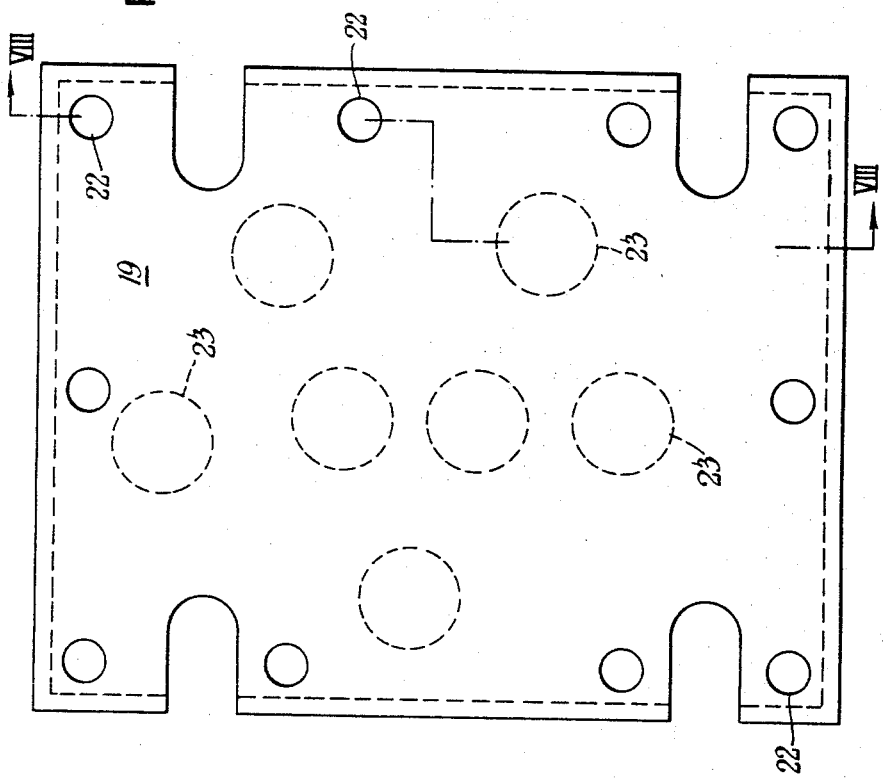

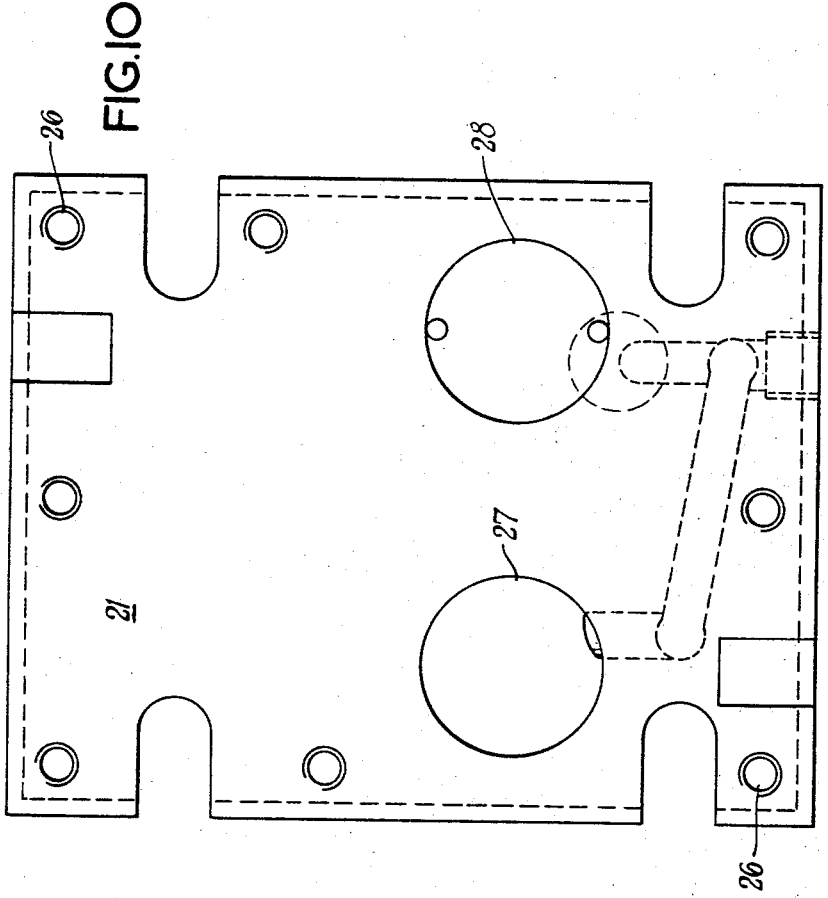
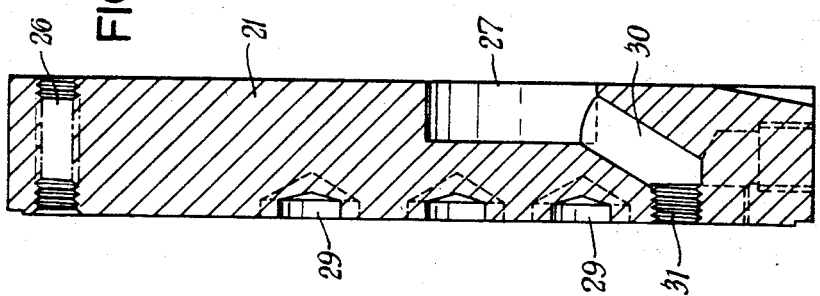

Dec. 24, 1968   R. H. RICHENS ET AL   3,417,967
FLUID MIXING DEVICES
Filed July 17, 1967   6 Sheets-Sheet 6
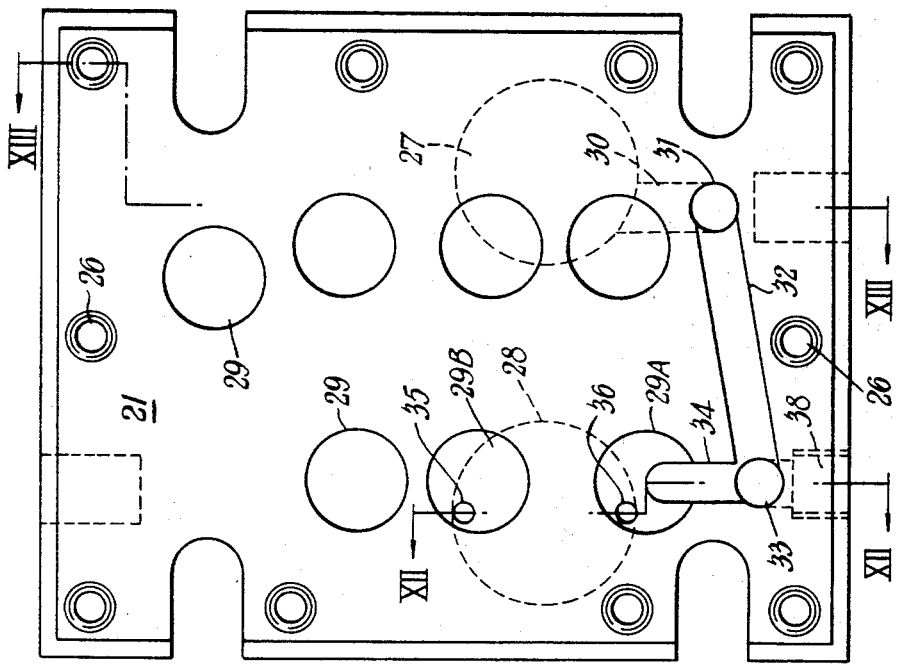
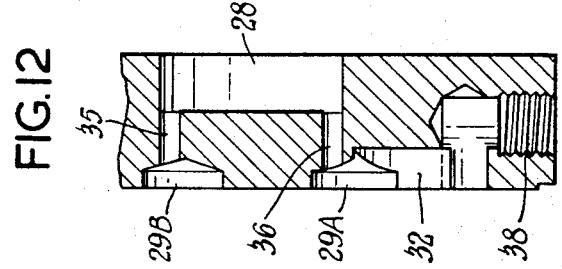

United States Patent Office 3,417,967
Patented Dec. 24, 1968

3,417,967
FLUID MIXING DEVICES
Raymond Harold Richens, William James White, and
William Frank Cole Richardson, Filton House, Bristol,
England, assignors to Bristol Aeroplane Plastics Limited
Filed July 17, 1967, Ser. No. 653,699
Claims priority, application Great Britain, July 20, 1966,
32,630/66
2 Claims. (Cl. 259—4)

ABSTRACT OF THE DISCLOSURE

A device for mixing liquids which eliminates any moving parts. The liquids are caused to flow through a sinuous passageway having a number of flow-reversing channels defined by sharp-edged baffles. Two ways of providing such a channel are described.

This invention relates to mixing devices for fluids and particularly to the elimination of moving parts in such devices.

Known mixing devices for fluids usually comprise a mixing chamber into which the fluids to be mixed are fed and in which a mixing paddle or rotor is rotated, the mixed fluids being led away through an outlet. Such devices have moving parts with glands and bearings which are subject to wear and present problems in maintenance and cleansing and do not always readily mix fluids as intimately as is desired, especially when, for example, a large proportion of viscous liquid has to be mixed intimately with a relatively small proportion of another non-viscous liquid. No matter how intricate is the mixing path it is difficult to avoid dead-spots, so that some parts of the final mix may be undermixed whilst other parts may indeed be overmixed.

The present invention has for its object the provision of a mixing device for fluids which has no moving parts and in which two or more fluids moving under pressure (e.g. by pumping) can be brought together in streams, already metered in required proportions, fed into and then through the device and therein be caused to mix intimately with one another irrespective of the difference in viscosity and proportions of the fluids. The device can be made of cheap materials, e.g. mild steel, and can be readily taken apart for cleaning. Special materials may have to be used if the fluids are corrosive.

According to the invention a mixing device for fluids has an inlet and an outlet spaced apart by a passageway, the passageway being made effectively sinuous by the provision therein of a series of flow-reversing channels defined by baffles arranged transversely to the mean direction of the passageway and having margins constituted by sharp edges over which the liquid flow takes place.

The passage is preferably sub-divided and re-united at frequent intervals so that the fluid mixture has imparted to it acceleration, deceleration, turbulence, shearing actions and also splitting actions due to constrictions in the cross-sectional areas of the passage, and in the preferred case sub-division of the passage, all of which ensure a thorough and intimate mixing of the fluids before the mixture leaves the exit from the device.

The invention also includes a method of mixing fluids consist of forcing the fluids to flow through such a passage.

Two embodiments of the invention will now be described by way of example with reference to the accompanying drawings, in which:

FIGURE 4 is a side elevation of a second embodiment, showing the assembly of a front, a middle and a back plate;

FIGURE 5 is a vertical cross-section of this embodiment;

FIGURE 6 is a section taken on the line VI—VI of FIGURE 5;

FIGURE 7 is an elevation of the front plate;

FIGURE 8 is a section taken on the line VIII—VIII of FIGURE 7;

FIGURE 9 is a similar elevation of the middle plate;

FIGURES 10 and 11 are elevations of the outer and the inner surfaces respectively of the back plate;

FIGURE 12 is a section taken on the line XII—XII of FIGURE 11; and

FIGURE 13 is a section taken on the line XIII—XIII of FIGURE 11.

Figure 1:
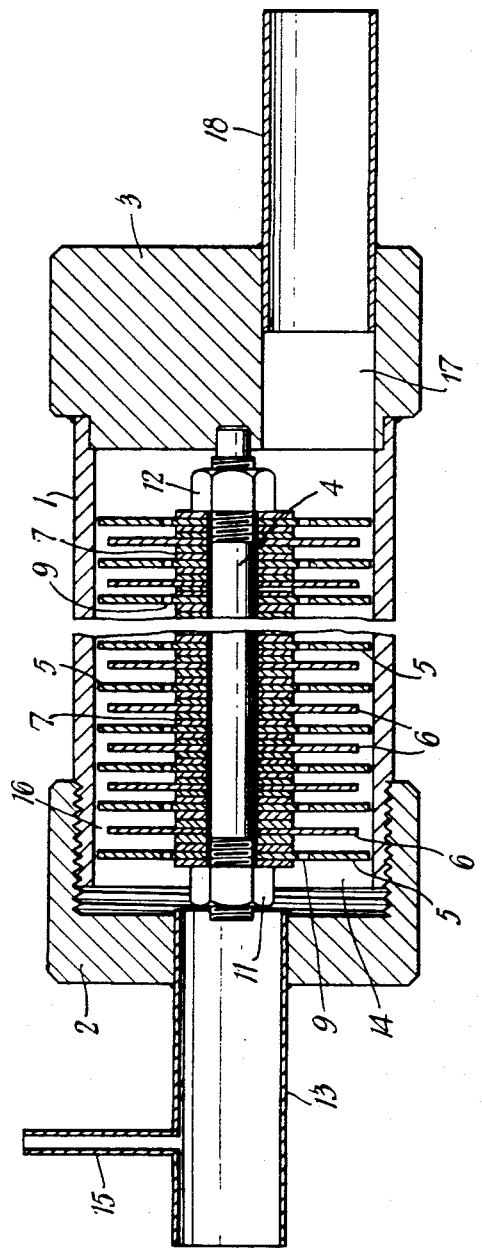
FIGURE 1 is a vertical cross-section of one embodiment.
Figure 3:
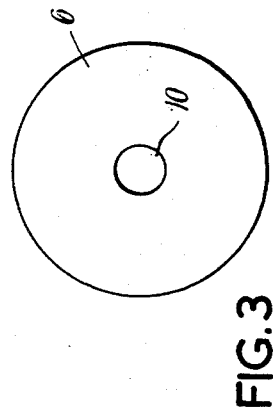
FIGURES 2 and 3 show details of the device shown in FIGURE 1.
Figure 2:
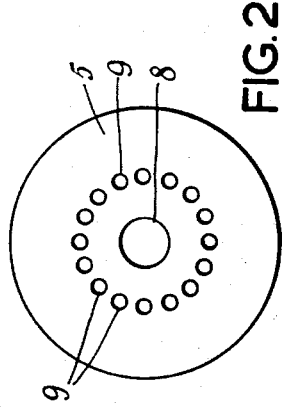

Referring to FIGURE 1, a tubular outer casing or body 1 has end caps 2 and 3, the cap 2 being threaded on to the casing. A central rod 4 fits into the end caps and supports an assembly of alternate discs or baffles such as 5 and 6 together with spacing washers such as 7. The discs 5 are each as shown in FIGURE 2 and have a diameter such as to fit the inner diameter of the outer casing 1. Each disc has a central hole 8, through which passes the rod 4, and a co-axial row of perforations 9. The alternate discs are of a slightly smaller diameter and have corresponding central holes 10 for the rod 4. The discs 5 and 6 are assembled alternately on the rod 4 with a spacing washer 7 between each disc and the assembly of discs and washers is clamped together so as to form a column between nuts 11 and 12 threaded onto the rod 4.

The end cap 2 carries a central outwardly extending tube 13 which serves as an input manifold and leads into a first mixing chamber 14 formed in the end cap. This tube forms an inlet for one of the fluids to be mixed, which in this case may be a resin, and it has a side branch 15 through which enters another fluid, such as a catalyst.

It can be seen that after initial mixing in the tube 13 and the manifold 14 the fluids are forced to flow through the perforations 9 in the first of the discs 5, then to expand radially outwards, next to flow axially through an annular gap 16 between the outer edge of the adjacent discs 6 and the inner wall of outer casing 1 and then to contract radially inwards to flow through the perforations in the next of the discs 5. The discs or baffles set so as to reverse the direction of flow of the fluids. This confined passage is repeated along the length of the column, the fluids flowing through and round alternate discs until, by now thoroughly mixed, they are finally discharged into a passage 17 in the end cap 3, to leave the mixing device through an exit tube 18. The mixed fluids are thus divided by the perforations in discs 5 and are re-united as they flow out of them and are also forced to flow over sharp edges at the perforations and around the outer edges of the discs 6.

It should be noted that the device is used with its axis vertical with the input manifold at the bottom, thereby avoiding any air bubbles being entrained in the mixed stream of fluids.

In a modified arrangement the discs 6 are made to fit the inside diameter of the casing and are provided with spaced notches in their outer edges to permit the flow of the fluids there-through instead of through an annular space as shown in the drawing.

The device is easily cleaned by unscrewing the end cap 2 which allows withdrawal of the entire column assembly.

This particular embodiment is suitable for mixing synthetic resins, for example, 100 parts of a highly viscous synthetic resin such as a polyester (plus accelerator if required) and 2 parts of a catalyst—such as a non-viscous M.E.K.P. (methyl ethyl ketone peroxide) or, alternatively, an accelerator.

The number of discs required and the number and size of the holes in the discs 5 and the dimensions of the annular clearances around the discs 6 depend on the viscosity and flow rate of the liquids being mixed. The holes for the mixture given above by way of example are of the order of ³⁄₃₂″ diameter and the annular clearance around the discs 6 is also of the order ³⁄₃₂″.

By suitably modifying the input manifold so as to provide a multiplicity of inlets, the device can be used for mixing more than two fluids.

The amount of work done in forcing the fluids through the passage is considerable, particularly in view of the shearing action, and it may sometimes be found that the resulting temperature rise is such as to make it desirable to provide for the cooling of the device. This can be done by the provision of an external cooling jacket or by making the outer casing 1 sufficiently thick to allow for the provision of axial cooling passages through which any coolant such as water or a conventional refrigerant may flow. Again the central rod 4 may be replaced by a tube through which a coolant can flow. The coolant will, of course, be introduced at the exit end, that is to say the top, of the device and will leave from the other end.

In certain cases it may be desirable to use these modifications for heating instead of for cooling purposes.

Referring now to FIGURE 4, this and subsequent figures show an embodiment in the form of a flat pack. FIGURE 4 shows a front plate 19, a middle plate 20 and a back plate 21 all of mild steel and bolted together so as to form a body having a compact assembly. These plates are formed with a system, to be described later, of intercommunicating holes and recesses drilled or machined in the plates so as again to provide a confined passage for the fluids to be mixed.

The front plate 19 is shown in detail in FIGURES 7 and 8. Holes such as 22 are drilled for assembly purposes and the essential feature of the plate consists of a number of countersunk recesses such as 23. The middle plate 20, FIGURE 9, has corresponding assembly holes 24 and in this plate the essential feature is a number of holes such as 25 passing right through the plate, the walls 25A between any two adjacent holes acting as baffles.

The back plate 21, FIGURES 10, 11 and 13, also has corresponding assembly holes such as 26 and the outer surface, shown in FIGURE 10, has two large input recesses 27 and 28, in this case for the entry of a resin and a hardener respectively. The inner surface has a number of countersunk recesses such as 29, FIGURES 11, 12 and 13, of similar shape to the recesses 23 in the front plate 19. The inlet recess 27 communicates with one of the recesses 29, numbered 29A, by internal passages or conduits 30, 31, 32, 33 and 34, whilst the inlet recess 28 communicates with two of the recesses 29, numbered 29A and 29B, by means of two drillings or conduits 35 and 36. Thus the recess 29A forms a first mixing chamber.

FIGURES 5 and 6 show how the confined passage is formed when the three plates 19, 20 and 21 are bolted together, the mixed fluids flowing from a recess in, say, the front plate, through a hole in the middle plate to a recess in the back plate and so on. The device is mounted so that the fluids enter towards the bottom, travel upwards through the circuitous passage, FIGURE 5, and are finally discharged through an exit tube 37. (In FIGURE 5, the recesses and the holes have not been given reference numerals in the interests of clarity.) A drain 38 is provided at the bottom of the device.

The amount by which the countersunk recesses in the outer plates overlap the holes in the middle plate determines the degree of restriction and expansion in the passage and their sharp edges produce the shearing action on the fluid mixture as it is forced through the passage.

The device in this instance is suitable for use with fluids of similar viscosity to one another and in the proportions of ²⁷⁄₁₀₀.

This second embodiment is convenient in cases of limited space or special geometric limitations, or when it is necessary for contact mounting of the device to be achieved on other equipment (e.g. a pump) maintained at a pre-determined temperature (as with certain epoxy resins).

This construction can also be readily taken apart for cleaning and is devoid of moving parts.

If cooling is required, this second embodiment may well be cooled by introducing a coolant or a refrigerant into a system of ports 40 and cross ports 42 appropriately drilled in the front and the back plates.

We claim:
1. A device for mixing liquids comprising an assembly of a front plate, a back plate and a middle plate, all in clamped relationship, said device having an inlet and an outlet spaced apart by a passageway for said liquids through said plates, said passageway being made effectively sinuous by the provision therein of a series of flow-reversing channels defined by baffles arranged transversely to the means direction of said passageway and having margins constituted by sharp edges over which the liquid flow takes place, said passageway defined in combination by a series of holes in said middle plate through which said liquid flow takes place, the holes being arranged in rows such that the walls between adjacent holes in a row constitute said baffles, the edges of the holes constituting a series of sharp-edged margins, and by a series of recesses in said front and said back plates through which said liquid flow takes place from one of said holes to the adjacent hole in the direction of said liquid flow, the edges of said recesses also constituting a series of sharp-edged margins.

2. A device according to claim 1 having a system of ports and cross ports for the flow of a coolant, said ports and cross ports being formed in said front and said back plates.

References Cited

UNITED STATES PATENTS

| | | | |
|---|---|---|---|
| 1,626,487 | 4/1927 | Warren | 259—4 |
| 2,584,827 | 2/1952 | Bailey | 259—4 |
| 2,802,648 | 8/1957 | Christensen | 259—4 X |
| 2,965,695 | 12/1960 | Sleicher | 259—4 X |
| 3,239,197 | 3/1966 | Tollar | 259—4 |
| 3,266,780 | 8/1966 | Waters | 259—4 |

ROBERT M. JENKINS, *Primary Examiner.*